US010942137B2

(12) United States Patent
Klueg

(10) Patent No.: US 10,942,137 B2
(45) Date of Patent: Mar. 9, 2021

(54) RECONSTRUCTION OF X-RAY SPECTRA USING INTEGRATING DETECTORS (ROXS-ID)

(71) Applicant: The Government of the United States of America, as represented by the Secretary of Homeland Security, Washington, DC (US)

(72) Inventor: Robert E. Klueg, Clayton, NJ (US)

(73) Assignee: The Government of the United States of America, as represented by the Secretary of Homeland Security, Washington, DC (US)

( * ) Notice: Subject to any disclaimer, the term of this patent is extended or adjusted under 35 U.S.C. 154(b) by 42 days.

(21) Appl. No.: 16/364,389

(22) Filed: Mar. 26, 2019

(65) Prior Publication Data
US 2020/0309720 A1 Oct. 1, 2020

(51) Int. Cl.
*G01T 1/36* (2006.01)
*G01N 23/087* (2018.01)

(52) U.S. Cl.
CPC ........... *G01N 23/087* (2013.01); *G01T 1/362* (2013.01)

(58) Field of Classification Search
CPC ........ G01N 23/00; G01N 23/04; G01N 23/06; G01N 23/083; G01N 23/087; A61B 6/00; A61B 6/4035; A61B 6/405; A61B 6/4241; A61B 6/44; A61B 6/482; A61B 6/4042; G01J 5/0828; H01J 29/898; G01T 1/362
USPC ........................... 378/62, 156, 157, 158, 204
See application file for complete search history.

(56) References Cited

U.S. PATENT DOCUMENTS

2019/0117177 A1* 4/2019 Cuadros ................. A61B 6/482

OTHER PUBLICATIONS

Emil Y. Sidky et al., "Accurate image reconstruction from few-views and limited-angle data in divergent-beam CT", University of Chicago Department of Radiology, Chicago, IL, Apr. 28, 2009, arXiv:0904.4495v1 [physics.med-ph].
Justin Romberg, "Imaging via Compressive Sampling [Introduction to compressive sampling and recovery via convex programming]" IEEE Signal Processing Magazine, Mar. 2008, pp. 14-20.

* cited by examiner

*Primary Examiner* — Jurie Yun
(74) *Attorney, Agent, or Firm* — Lavanya Ratnam; Kelly G. Hyndman

(57) ABSTRACT

An X-ray imaging system for reconstructing X-ray spectra includes an integrating detector and a measurement mask, including at least one physical filter, positioned between the integrating detector and an X-ray source spectrum. The integrating detector receives a masked X-ray spectrum after the source spectrum has been filtered in accordance with the measurement mask. As a result of the measurement mask containing one or more physical filters being combined, a measurement mask having energy band-pass regions can be generated, to cover the source spectrum. Measured data, based on the masked X-ray spectrum and characteristics of the measurement mask, is collected from the integrating detector. The X-ray imaging system reconstructs an X-ray spectrum and generates the reconstructed X-ray spectrum based on applying a predetermined algorithm, such as total variation minimization reconstruction, to the measured data.

20 Claims, 14 Drawing Sheets

RECONSTRUCTION OF X-RAY SPECTRA USING INTEGRATING DETECTORS (ROXS-ID)

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

X-ray imaging modalities employ bremsstrahlung sources that emit photons over a wide and continuous energy range. Energy-sensitive X-ray detectors can lack spatial resolution and have poor energy resolution. Also, for energy-sensitive detectors that do exhibit high energy resolution, the higher resolution comes with tradeoffs, because such detectors often need to be cooled significantly to reduce thermal noise which adds to the complexity and expense of implementation.

SUMMARY

The foregoing paragraphs have been provided by way of general introduction, and are not intended to limit the scope of the following claims. The described embodiments, together with further advantages, will be best understood by reference to the following detailed description taken in conjunction with the accompanying drawings.

According to aspects of the disclosed subject matter, a system for reconstructing X-ray spectra can include an X-ray imaging system. The X-ray imaging system can include an integrating detector and a measurement mask, including at least one physical filter, positioned between an X-ray source and the integrating detector. The physical filters can be combined, e.g., randomly, to allow a large range of X-ray energies to pass. The measurement mask enables the integrating detector to receive a masked X-ray spectrum after passing through the measurement mask. As a result of the measurement mask containing one or more physical filters being combined, a measurement mask with wide energy band-pass regions can be generated. Measured data can then be collected from the integrating detector, based on the masked X-ray spectrum and the measurement mask. The X-ray imaging system can reconstruct an X-ray spectrum and generate the reconstructed X-ray spectrum based on applying a predetermined algorithm, such as total variation minimization reconstruction, to the collected data.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
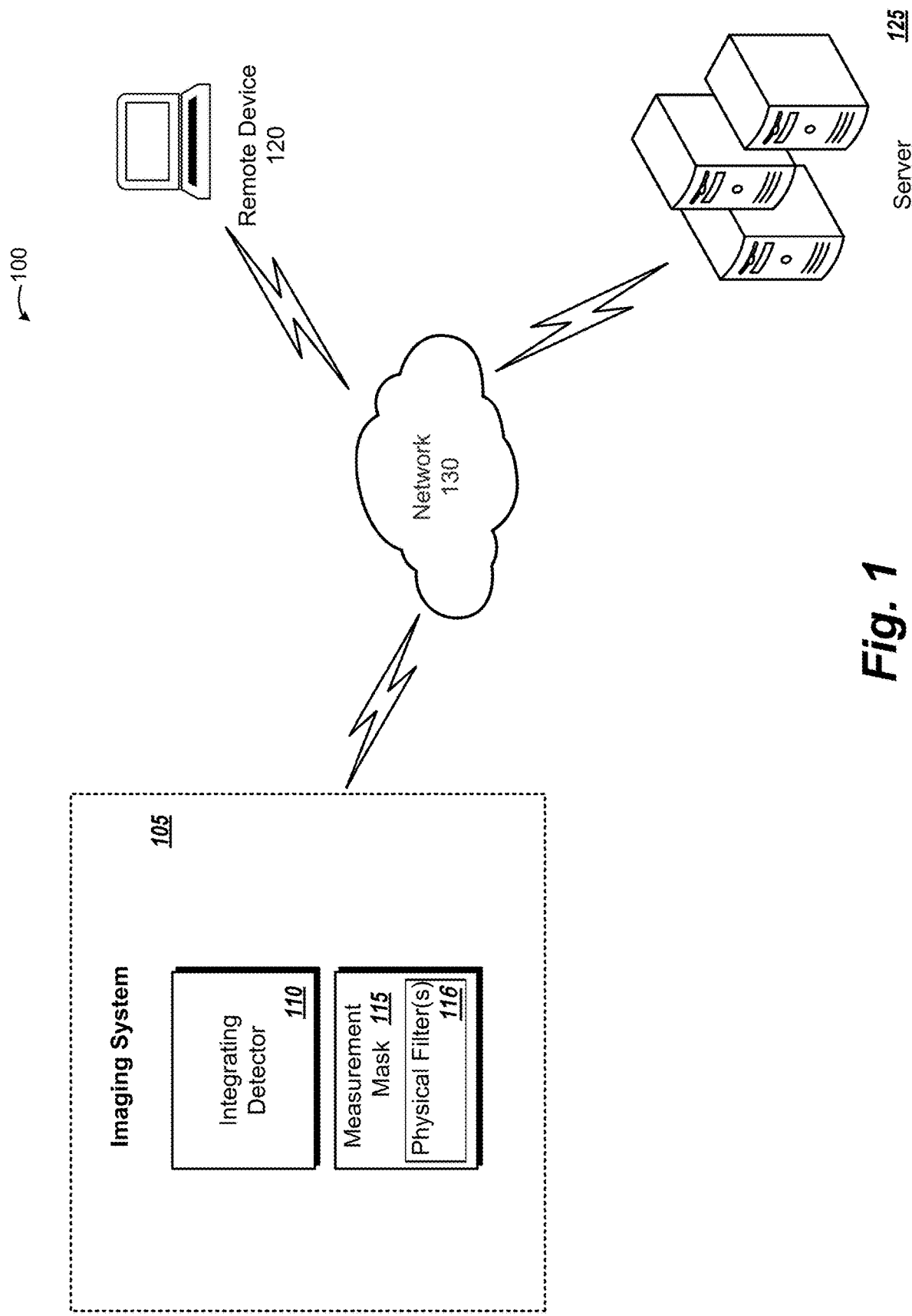
FIG. 1 depicts an example overview of a system for reconstructing X-ray spectra using an integrating detector according to one or more aspects of the disclosed subject matter.

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed subject matter. However, it will be apparent to those skilled in the art that embodiments may be practiced without these specific details. In some instances, well-known structures and components may be shown in block diagram form in order to avoid obscuring the concepts of the disclosed subject matter.

Reference throughout the specification to "one embodiment" or "an embodiment" means that a particular feature, structure, characteristic, operation, or function described in connection with an embodiment is included in at least one embodiment of the disclosed subject matter. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments. Further, it is intended that embodiments of the disclosed subject matter can and do cover modifications and variations of the described embodiments.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

Referring now to the drawings, wherein like reference numerals designate identical or corresponding parts throughout the several views.

FIG. 1 depicts an example embodiment of an overview of an X-ray spectra reconstruction system 100 using an integrating detector (herein referred to as system 100) according to one or more aspects of the disclosed subject matter. The system 100 can include an imaging system 105 connected to a remote device 120 and a server 125 via a network 130. The imaging system 105 can be an X-ray imaging system, for example. The imaging system 105 can include an integrating detector 110 and a measurement mask 115, which may include one or more physical filters 116. For X-ray imaging, integrating detectors can be used in nearly every application. Integrating detectors sum the energy of incoming photons for each pixel to form an image. Summing the energy results in a loss of energy-dependent information. Medical imaging and contraband detection technologies stand to benefit from energy-dependent information, otherwise lost by integrating detectors, because access to X-ray photon energy dependent information can improve the determination of the properties of materials being imaged, as well as the inherent quality of the images being produced.

In the example embodiment, the measurement mask 115 includes one or more physical filters 116 placed between an X-ray source spectrum (not shown in FIG. 1) and one or more sections of the integrating detector panel, as further described herein. An item to be imaged also is placed between the source spectrum and the integrating detector panel. In an example embodiment, the measurement mask 115 can be positioned in the imaging system 105 to be directly exposed to the source spectrum (i.e., measurement mask 115 positioned between the source spectrum and the item to imaged). In an example embodiment, the measurement mask 115 can be positioned in the imaging system 105 to directly exposed output from the measurement mask 115 to the integrating detector 110 (i.e., measurement mask 115 positioned between the item to imaged and the integrating detector 110). The imaging system 105 includes processing circuitry to assist in the operation of and/or to independently operate the system 100. The measurement mask 115 can be constructed as a mesh of filters, such as a selection of metal foils, mounted in a frame that is aligned with the integrating detector 110. In examples, the measurement mask 115 can be constructed by depositing/bonding filter materials onto a scintillator of the imaging system 105.

The server 125 can represent one or more servers connected to the imaging system 105 and the remote device 120 via the network 130. The server 125 can include processing circuitry to perform various processing for the system 100 as further described herein. In an example, the server 125 receives requests from one or more of the imaging system 105 and the remote device 120 via the network 130. Additionally, the server 125 can transmit information to the imaging system 105 and the remote device 120 via the network 130.

The remote device 120 can represent one or more remote devices connected to the imaging system 105 and the server 125 via the network 130. The remote device 120 can be a computer, a laptop, a tablet, a smart phone, a PDA, and the like. The remote device can include processing circuitry to assist in operating the system 100. The remote device 120 can include an interface, such as a digital and/or physical keyboard and/or a mouse and/or touch-based input functionality, allowing users to interact with functionality of the imaging system 105, for example.

One or more of the imaging system 105, the remote device 120 and the server 125 can include one or more local storage components to store various information, input, and/or output related to the operation of the system 100. An independent database can be accessible via the network 130.

The network 130 can represent one or more networks connecting the imaging device 105, the remote device 120, and the server 125. The network 130 can be a public network, such as the Internet, or a private network such as an LAN or WAN network, or any combination thereof and can also include PSTN or ISDN sub-networks. The network 130 can also be wired, such as an Ethernet network, or can be wireless such as a cellular network including EDGE, 3G 4G, and LTE/LTE-A wireless cellular systems. The wireless network can also be Wi-Fi, Bluetooth, or any other wireless form of communication that is known.

Figure 2:
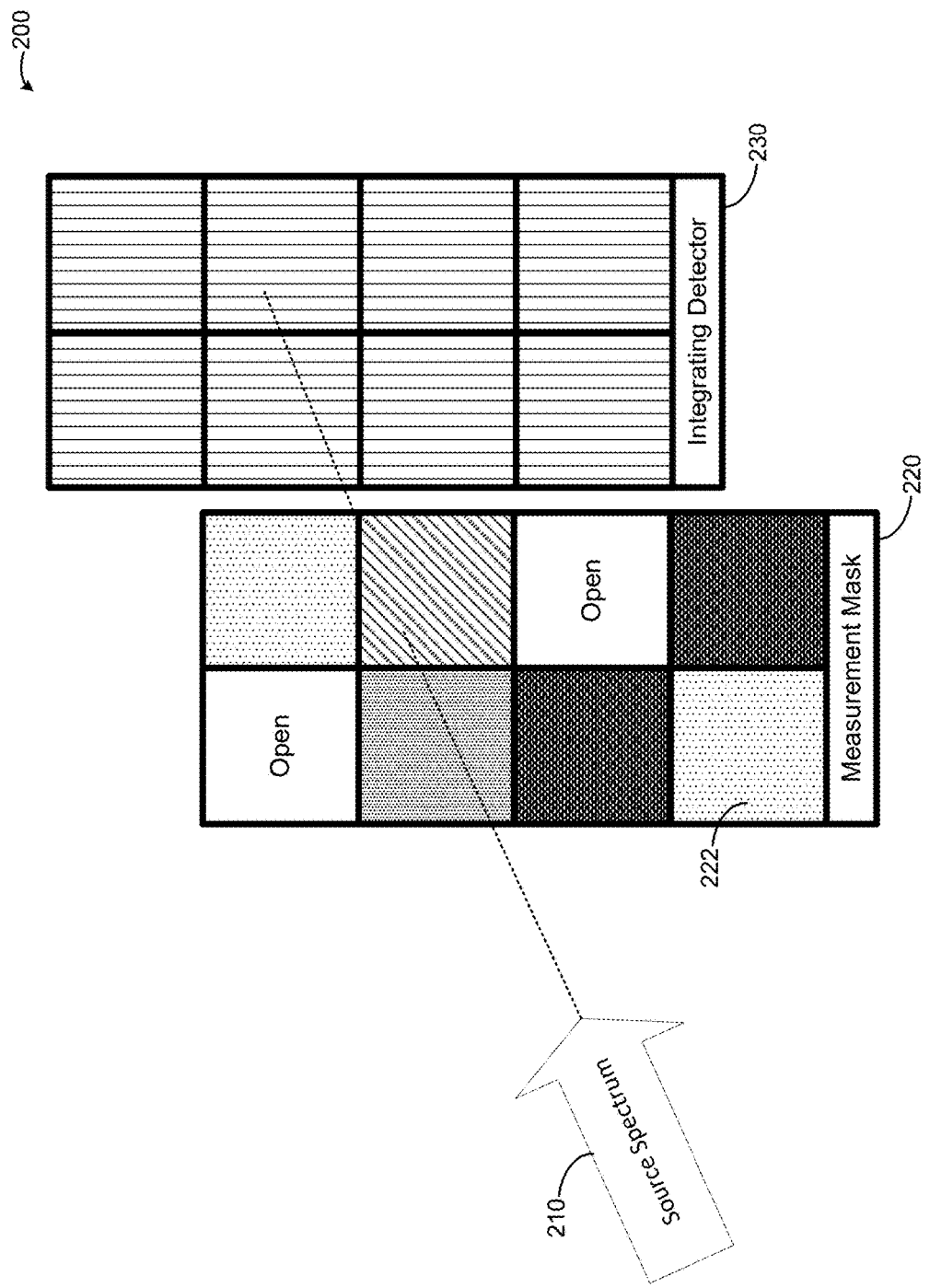
FIG. 2 depicts an example overview of a measurement mask for use with an integrating detector according to one or more aspects of the disclosed subject matter.

FIG. 2 depicts an example overview of a measurement mask 220 for use with an integrating detector 230 according to one or more aspects of the disclosed subject matter. A source spectrum 210 is emitted toward the integrating detector 230, filtered by the measurement mask 220, and received by the integrating detector 230 as a masked spectrum. The filtered spectrum is filtered in accordance with the measurement mask 220 and falls onto the integrating detector 230 as a masked spectrum. The measurement mask 220 specifies, e.g., in energy-intensity space, what energies of photons are being allowed to pass through the various filters, such that the measurement mask does not necessarily map the physical location(s) of filter(s).

The integrating detector 230 is illustrated for the sake of simplicity as having 8 pixels, and the figures are not shown to scale (a detector pixel would be on the order of 1 millimeter square, and the pixels of the integrating detector 230 can be arranged along a curved arc). Similarly, the measurement mask 220 is illustrated as a grid of 8 materials, arranged to correspond to the pixels of the integrating detector on a 1:1 basis. Accordingly, the measurement mask 220 filters the source spectrum 210 by a single material per pixel of the integrating detector 230. The measurement mask 220 can include open sections, to allow unfiltered source spectrum 210 to pass through unfiltered when the source spectrum is filtered in accordance with the measurement mask 220. The location of the different filter materials within the measurement mask can be arranged randomly, or according to a mathematical pattern. For example, the mathematical combinations of different filter materials can be calculated, for those materials suitable for analysis of a given X-ray source spectrum. The filter materials can then be laid out in the grid of the measurement mask according to the mathematical combinations. In an example embodiment, all possible combinations of the materials can be generated, with each combination being implemented once in the measurement mask. A subset of the possible filter materials can be used, without needing to use all materials, by determining an appropriate threshold level of resolution, and eliminating those materials that are not necessary to generating that threshold level (e.g., omit those materials that merely serve to smooth out the reconstructed spectrum, in view of other materials). In an example, the filter materials can be chosen and arranged on a pseudo-random basis, e.g., based on an algorithm using a random number generator to identify the choice of filter materials and the grid location for the various filter materials. As shown in FIG. 2, five different filter materials (including "open" which represents no filter material) are arranged randomly in the eight possible grid locations for the illustrative measurement mask 220.

The measurement mask 220 is shown, for the sake of illustration, positioned approximately midway between the source spectrum 210 and the integrating detector 230. The measurement mask 220 can be positioned closer to the source spectrum 210 or the integrating detector 230. In an example embodiment, the measurement mask 220 can be coupled to the source spectrum 210, e.g., deposited as metal layers directly onto a surface of an X-ray source tube or imaging system scintillator. In an example embodiment, the measurement mask 220 can be coupled to the integrating detector 230, e.g., as an overlay frame mounted onto the integrating detector. In an example embodiment, the measurement mask 220 is positioned, relative to a section of the imaging system for receiving an item to be imaged, such that the measurement mask 220 will directly receive the source spectrum 210 (e.g., positioned upstream of the item to be imaged). In an example embodiment, the measurement mask 220 is positioned downstream of the item to be imaged, such that the integrating detector 230 will directly receive the masked spectrum passing through the measurement mask 220.

The measurement mask 220 can be made of thin foils of different metals having various X-ray attenuation properties, e.g., according to absorption edges that can be used to span the energies in the source spectrum, as described in further detail below. Example filter materials include tin, copper, titanium, indium, nickel, iron, gold, and other materials, which can be identified and chosen based on various characteristics, such as their X-ray absorption edges, in view of baseline attributes of the X-ray source. The measurement mask 220 can be constructed in various ways, such as by using thin foils with sufficient thickness to maintain structural integrity when supported by a frame. The measurement mask can be constructed of transparent material that has been selectively coated or sputtered with metal filter materials corresponding to grid sections of the transparent material. In an example, the measurement mask 220 can be formed by directly coating a section of the imaging system, e.g., by depositing thin films of metals onto a scintillator of an X-ray source.

Figure 3:
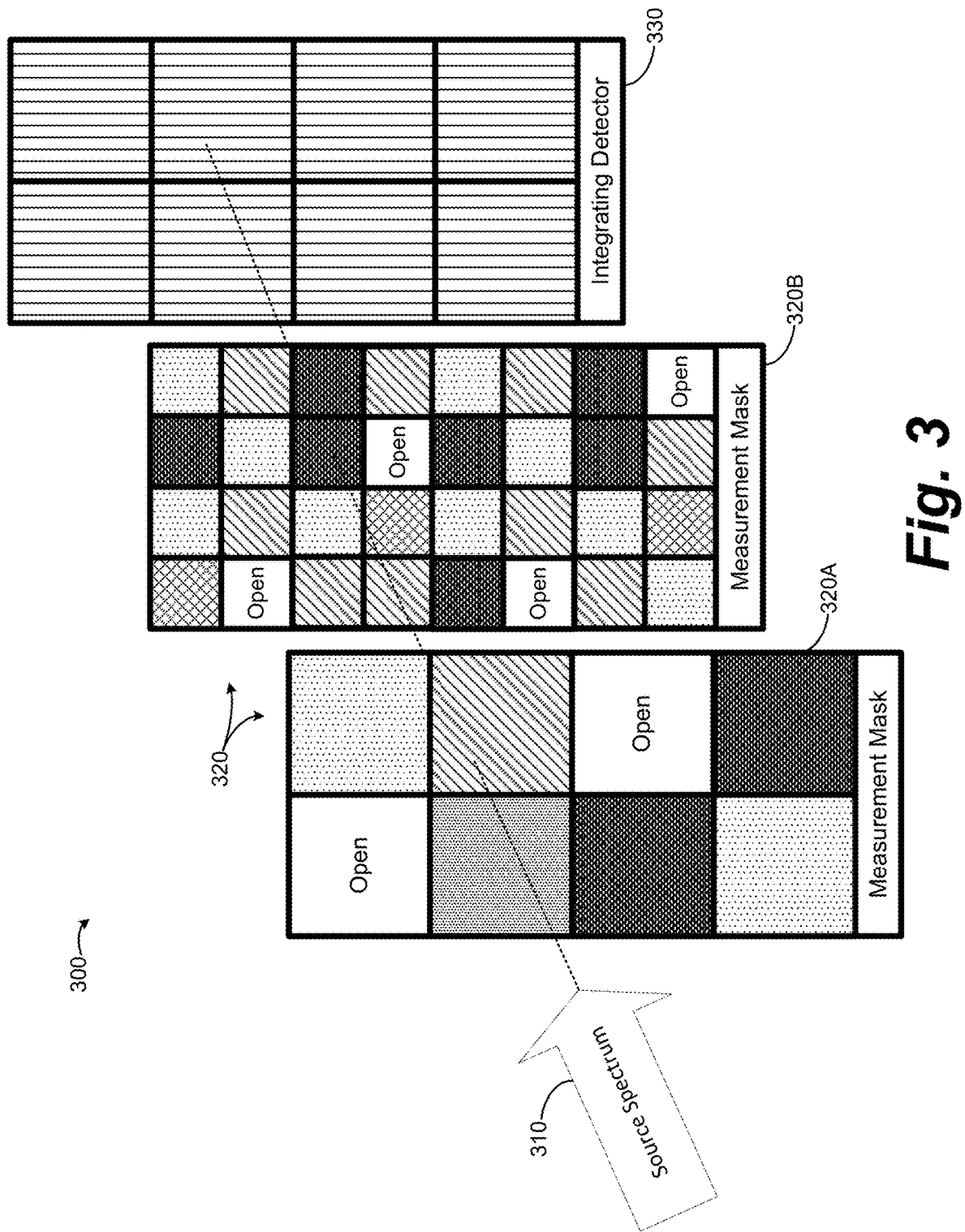
FIG. 3 depicts an example overview of a layered sub-pixel measurement mask for use with an integrating detector according to one or more aspects of the disclosed subject matter.

FIG. 3 depicts an example overview of a layered sub-pixel measurement mask for use with an integrating detector according to one or more aspects of the disclosed subject matter. The source spectrum 310 is emitted toward the integrating detector 330, and filtered by two layers of the measurement mask 320 (illustrated in an exploded view for clarity). The filtered spectrum is filtered in accordance with the measurement mask 320 and falls onto the integrating detector 330 as a masked spectrum.

The integrating detector 330 is illustrated for the sake of simplicity as having 8 pixels. Similarly, a first layer of the measurement mask 320A is illustrated as a grid of 8 materials, arranged to correspond to the pixels of the integrating detector on a 1:1 basis. A second layer of the measurement mask 320B is illustrated as a grid of 32 materials, arranged to correspond to the pixels of the integrating detector on a 4:1 basis according to a sub-pixel basis. Accordingly, the measurement mask 320 filters the source spectrum 310 by multiple materials, corresponding to each pixel of the integrating detector 330. In an example embodiment, a pixel of the integrating detector 330 can receive unfiltered source spectrum 310, by aligning one open grid position of measurement mask 320A with four corresponding open grid positions of measurement mask 320B.

In other embodiments, the sub-pixel layer of measurement mask 320B can be used alone, without the measurement mask 320B. Additional layers, with varying pixel densities, can be stacked and used in the measurement mask. In various embodiments, a layer can include larger grid sizes to allow a single material to cover/overlap multiple pixels of the integrating detector. A layer can include smaller grid sizes, e.g., having sub-pixels on a 9:1, 16:1, or other ratios relative to the pixel size of the integrating detector. In an embodiment, the measurement mask can be configured to enable a combination of all available filter materials relevant to a given X-ray source to cover a given pixel of the integrating detector.

The mathematical approach for analyzing collected measurements can be varied in accordance with the type of measurement mask. For example, in embodiments where each pixel of the integrating detector is covered by no more than one filter material, the collected data from multiple detector pixels can be combined, e.g., to convolve together different ones of the various detector pixels' collected data. Accordingly, such information about the type and configuration of the measurement mask (type of filter material(s), grid positions of those materials, grid size, number of layers, and so on) can be provided to a computing system to ensure an appropriate mathematical approach is performed on collected data, in order to apply a reconstruction algorithm using, e.g., a measurement matrix having values corresponding to grid positions and filter materials/attenuations. Such metrics corresponding to a given measurement mask can be assigned a mask identification, which can be communicated to a computing system (either manually by an operator, or automatically by the computing system recognizing an identification associated with the mask (barcode, RFID, mechanical keying, and the like). In an example embodiment, different types of measurement mask configurations can be assigned corresponding mask reference numbers, which can be coded into the masks for automatic electronic identification by the imaging system to which the coded measurement mask is fitted, thereby enabling the imaging system to automatically apply a mathematical reconstruction approach that is appropriate for that specific measurement mask configuration (e.g., identify characteristics of the measurement mask which translate into a measurement matrix to be used in a reconstruction algorithm).

Figure 4:
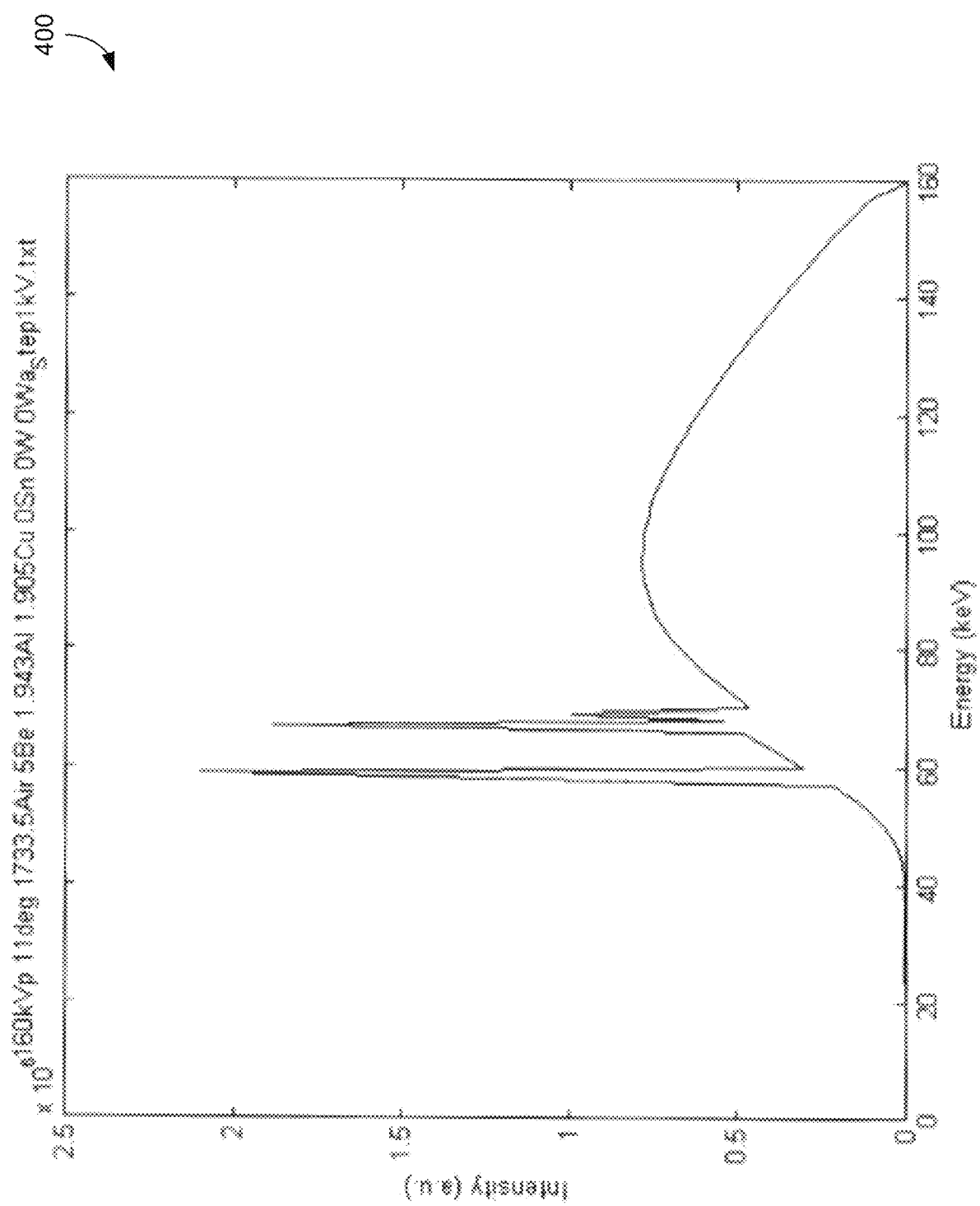
FIG. 4 depicts an example computational tungsten X-ray spectrum according to one or more aspects of the disclosed subject matter.

FIG. 4 depicts an example computational tungsten X-ray spectrum 400 according to one or more aspects of the disclosed subject matter. The computational tungsten X-ray spectrum 400 is an example of a computationally modeled bremsstrahlung X-ray radiation spectrum. Also present in the emission spectra of bremsstrahlung X-ray sources are fluorescence photons that are characteristic of the electron energy levels of the source's anode material. For example, with reference to FIG. 4, tungsten anode fluorescence photons are represented by intense peaks around 60 keV and 70 keV. The various embodiments described herein are capable of working with other types of X-ray sources, with corresponding baseline characteristic X-ray source spectra. For example, embodiments can also operate with X-ray sources based on molybdenum, copper, silver, gold, rhodium, rhenium, graphite, iron, and other X-ray anode materials, e.g., those suitable for non-destructive evaluation.

The illustrated peaks, and other characteristics of the source spectrum 400 can change or have long-term drift over time, e.g., with repeated usage of the X-ray source. The example embodiments and approaches described herein enable an imaging system to identify real-time feedback on whether the source spectrum is changing, including changes related to high-voltage supply fluctuations, physical changes in the structure and/or stability of the X-ray source (e.g., anode pitting), changes in power output and/or shifts in mean energy location, the occurrence of beam hardening, gas infiltration into the X-ray tube, and other changes that can occur in a given imaging system. Accordingly, the embodiments described herein provide additional benefits, in addition to increased energy spectrum and spatial resolution imaging benefits, such as identifying problems developing with the imaging system, changes in stability of imaged explosives including rapidly evolving homemade explosives (HMEs), details of images in medical applications, when it may be time to perform repairs to the imaging system, when an X-ray tube may need to be re-aligned, serviced, or replaced, and other benefits related to identifying changes in the source spectrum as enabled by the embodiments described herein.

Figure 5:
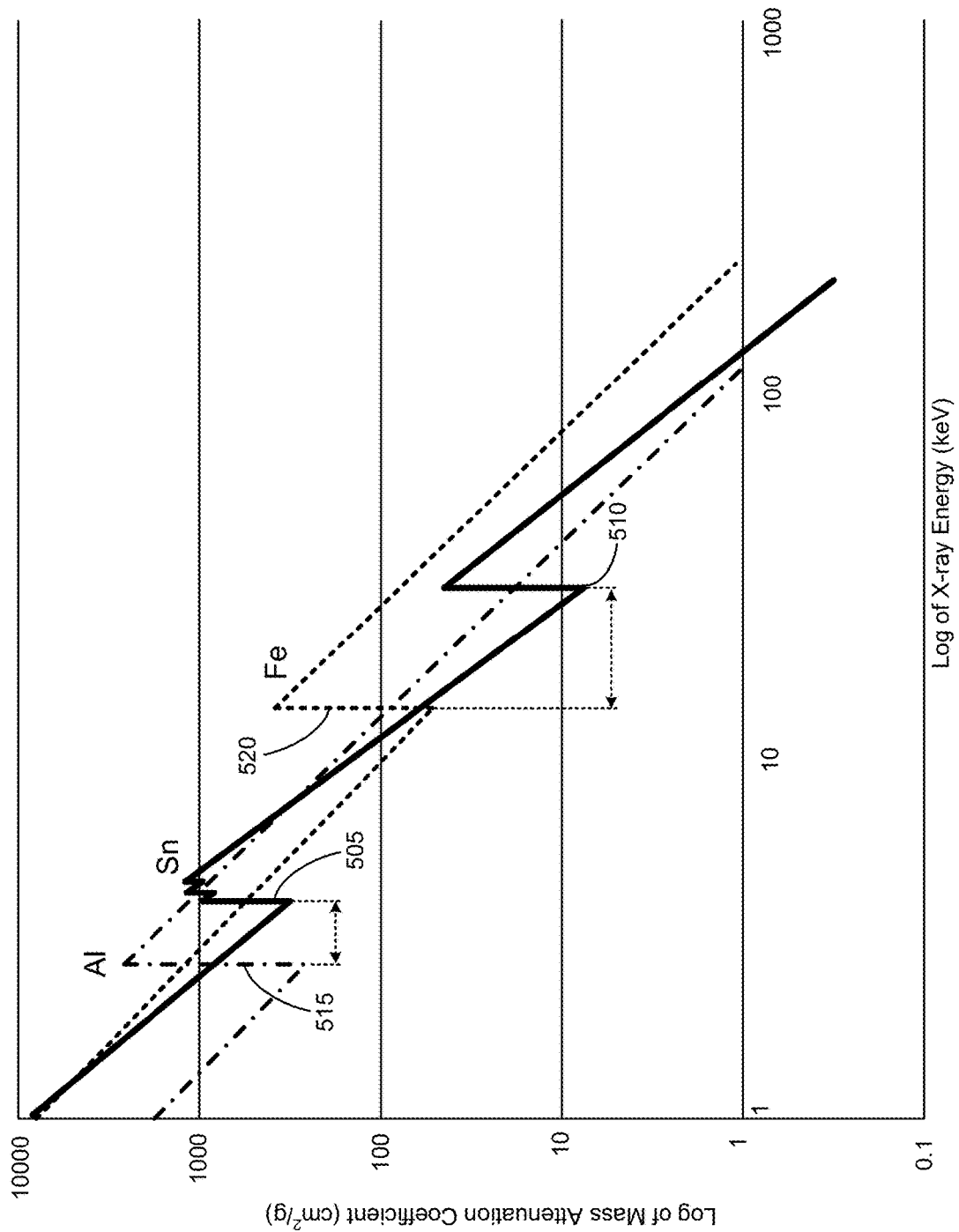
FIG. 5 depicts a log-log plot of the mass attenuation coefficient as a function of X-ray energy for aluminum, tin, and iron according to one or more aspects of the disclosed subject matter.

FIG. 5 depicts a log-log plot of the mass attenuation coefficient as a function of X-ray energy for aluminum, tin, and iron according to one or more aspects of the disclosed subject matter. Tin and other materials (including filter materials not specifically illustrated, such as indium and the like) are example materials that can serve as a filter, e.g., by using a thin film of tin that can be combined with one or more other filter materials to form a measurement mask 115. In order to access energy-dependent information with existing X-ray imaging infrastructure that otherwise lacks spatial/energy resolution, a new technique is proposed called Reconstruction of X-ray Spectra from Integrating Detectors (RoXS-ID). RoXS-ID can utilize various physical filters 116 that are placed in front of one or more portions of the integrating detector 110. The various physical filters 116 can have enhanced absorption edges that are at X-ray energies spanning the range of X-ray energies produced by the source. For example, FIG. 5 illustrates tin (Sn) having absorption edges 505 and 510, aluminum (Al) having absorption edge 515, and iron (Fe) having absorption edge 520. By aggregating the measurements that result from the use of a measurement mask with many filter combinations having absorption edges at different energies, the masked X-ray spectrum can be recovered by an integrating detector using a mathematical optimization technique called total variation minimization. In an example combination, a film of Al can be overlaid with a film of Fe, and the resulting combination provides a combination having a wide band-pass corresponding to the difference between the absorption edge 515 of Al and the absorption edge 520 of Fe.

More specifically, filter materials can be selected to create a "notch" between two absorption edges, corresponding to a difference in absorption. The two values corresponding to the absorption edges can be subtracted, and the remaining contrast will correspond to the energy band at the difference between the absorption edges. This approach creates an energy band for the measurement mask. To get additional resolution, additional filter materials are used, with corresponding differences in absorption edges, to sufficiently cover/span the energy space of the source spectrum to enable enough collected data of the masked spectrum for the reconstruction algorithm to reconstruct a representation of the source spectrum (i.e., reconstructed spectrum) to a desired level of resolution and/or convergence of the reconstructed spectrum.

Thus, the selection, and/or arrangement, of the various filter materials can be determined based on the expected baseline energy levels involved in the source spectrum (e.g., by identifying what type of X-ray source/tube will be involved, such as an X-ray tube based on tungsten with its characteristic energy levels), and the selection of filter materials to provide k-edges to address the characteristic baseline energy levels of the X-ray source, and the selection of filter materials to, in aggregate, cover a range of the baseline source spectrum. Accordingly, by selecting filter materials of the measurement mask to address the characteristic baseline energy levels expected for a given type of X-ray (e.g., tungsten based X-ray source), the example embodiments can obtain masked spectra that is filtered by the measurement mask to show finer details of the source spectrum, such as details illustrating a deviation from the baseline levels, to reveal additional details, such as degradation of the X-ray source, beam hardening, misalignment, or other finer details of a given X-ray source, in addition to identifying a type of the baseline X-ray source type.

Figure 6:
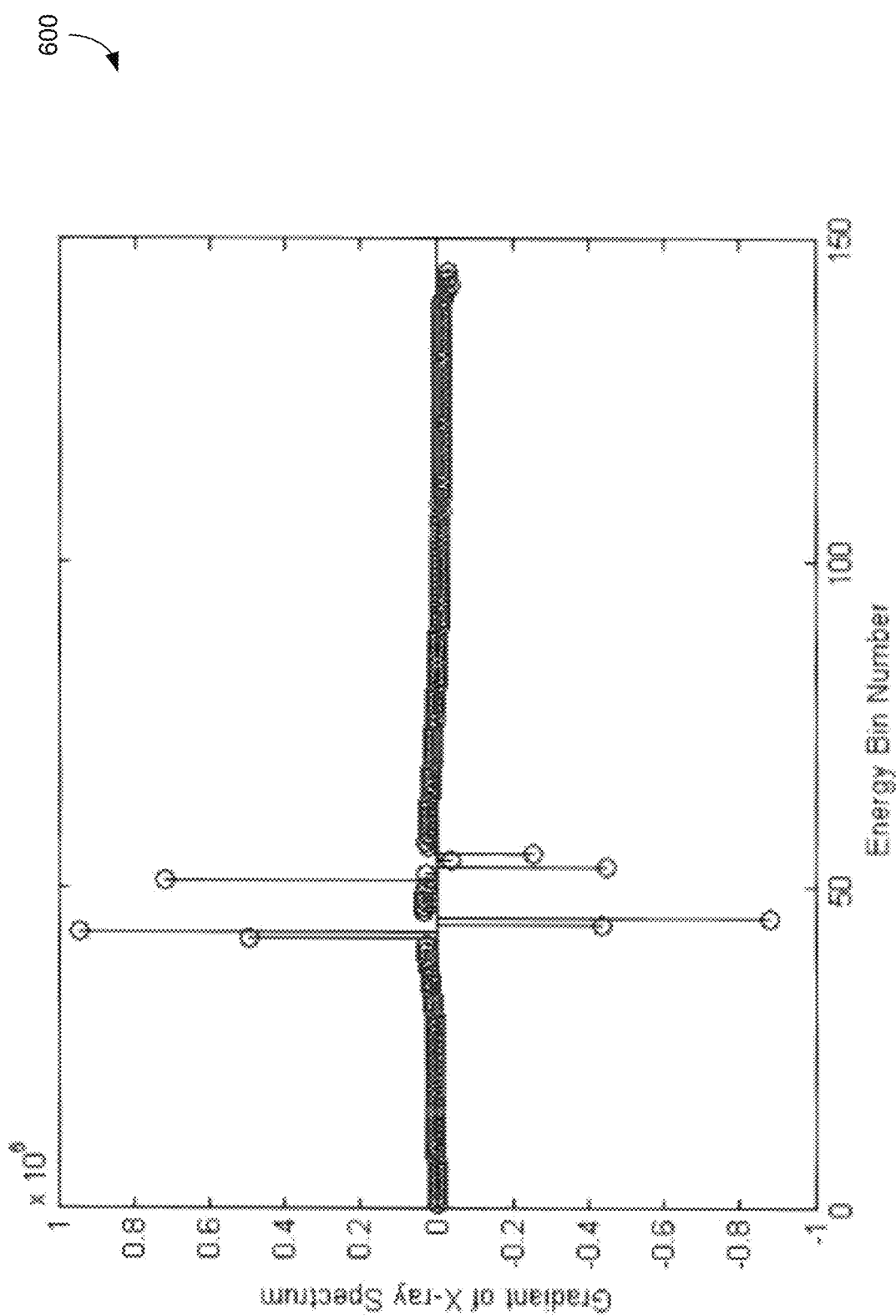
FIG. 6 depicts a first spatial derivative (gradient) of a tungsten X-ray spectrum according to one or more aspects of the disclosed subject matter.

FIG. 6 depicts a first spatial derivative (gradient) of a tungsten X-ray spectrum 600 according to one or more aspects of the disclosed subject matter. RoXS-ID was inspired by compressive sensing. Compressive sensing was developed in an attempt to circumvent the restrictions on signal sampling imposed by the Shannon-Nyquist sampling theorem. Compressive sensing exploits the fact that a signal that is dense in one basis may be sparse in another basis. A sparse signal has very few non-zero (or nearly non-zero) amplitude coefficients. For example, the spectrum 400 in FIG. 4 in the energy-intensity basis contains many non-zero values across the energy range. However, if the spectrum 400 is transformed by taking its first spatial derivative, as show in FIG. 6, the signal becomes sparse. Only a small fraction of the transformed amplitudes are large with most being at or near zero. The sparsity of the transformed X-ray spectrum implies that concepts from compressive sensing, particularly signal reconstruction methods, may be applicable. Sets of measurements at random energies can capture information about the signal in the sparse basis. Repeating many sets of these random measurements can provide enough information about the signal in the sparse basis to reconstruct the original signal (e.g., the X-ray spectrum 400).

Figure 7:
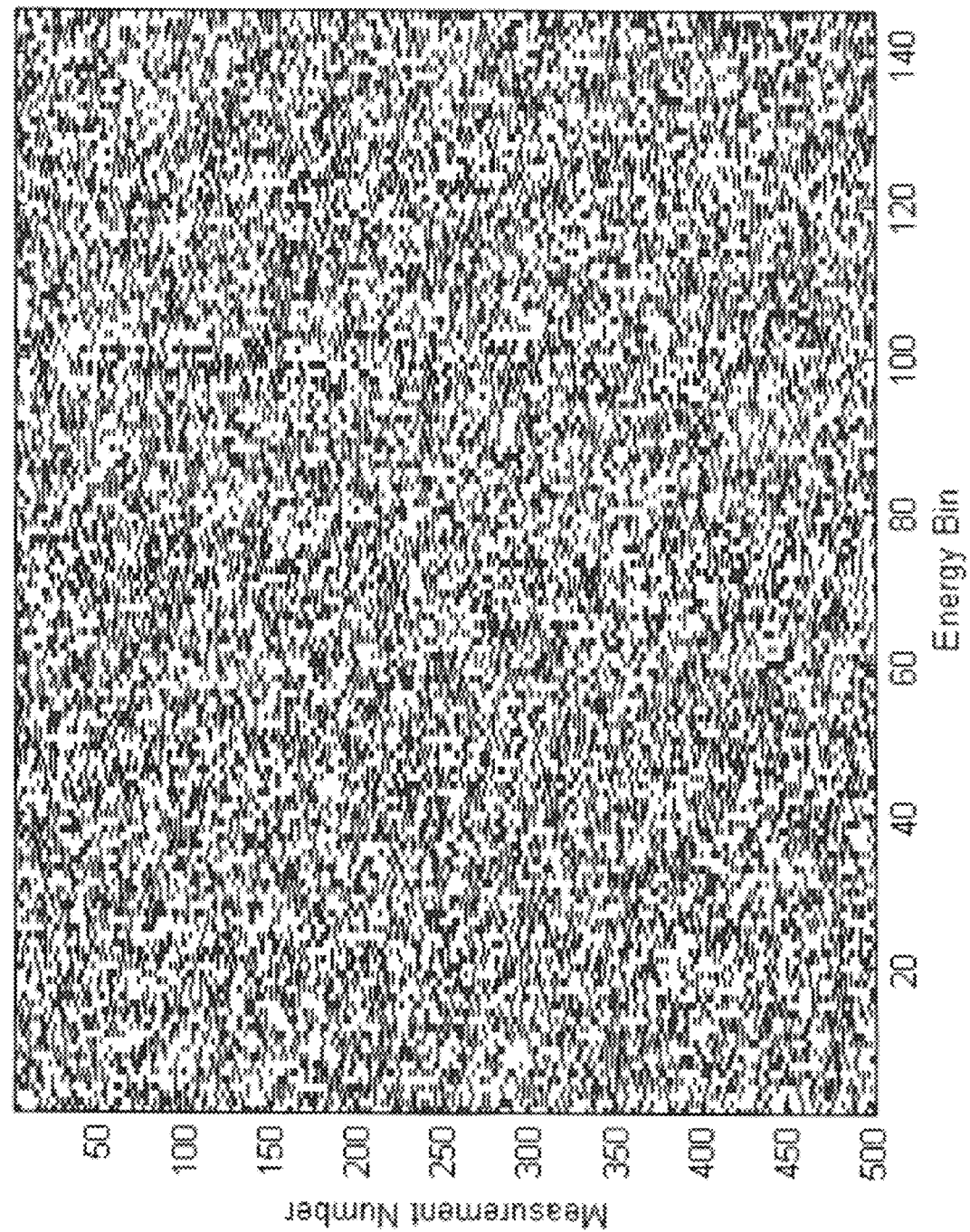
FIG. 7 depicts an example randomly generated measurement mask according to one or more aspects of the disclosed subject matter.

FIG. 7 depicts an example randomly generated measurement mask 700 according to one or more aspects of the disclosed subject matter. The illustrated depiction of measurement mask 700 represents the state of measurement (white=pass, black=block) for each energy bin of interest, where an energy bin corresponds to a narrow range of energy values. In other words, white areas represent X-ray energies that will be allowed to pass, while black areas represent blocked X-ray energies, for a given measurement number (repeated 500 times). In this example, 500 measurement trials were coded into the mask as represented by the y-axis measurement numbers. For each measurement number (row), a combination of hypothetical filters is applied by the measurement mask 700 to selectively block or pass the original signal as indicated by the black and white pixels, across the variously indicated energy bins for that row. The randomly generated measurement mask 700 may represent a level of precision that does not correspond to physically achievable combinations of metal foils to serve as filters, but is used to illustrate the techniques described herein as applied to fully pseudorandom combinations of passed/masked energy bins across 500 measurements.

Figure 8:
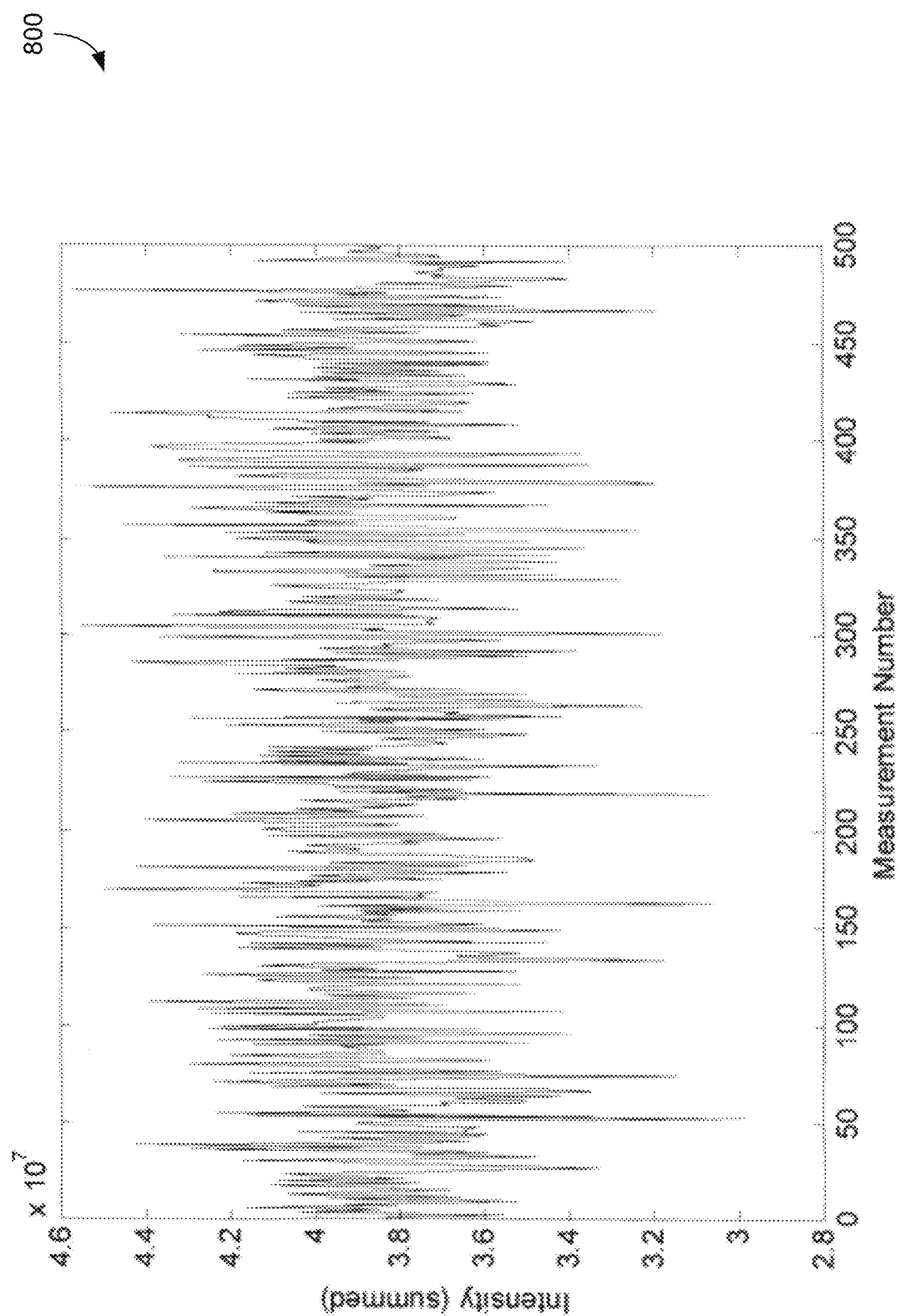
FIG. 8 depicts an example simulated measured data based on compressive sensing according to one or more aspects of the disclosed subject matter.

FIG. 8 depicts an example simulated masked measured data 800 based on compressive sensing according to one or more aspects of the disclosed subject matter. Modeling results can be based on determining g, the masked measured data 800, according to the following equation:

$$g = Mf \rightarrow \begin{bmatrix} g1 \\ \vdots \\ gn \end{bmatrix} = \begin{bmatrix} M_{11} & \cdots & M_{k1} \\ \vdots & \ddots & \vdots \\ M_{1n} & \cdots & M_{kn} \end{bmatrix} \begin{bmatrix} f1 \\ \vdots \\ fk \end{bmatrix} \quad \text{Equation 1}$$

The masked measured data 800, g, is represented as the inner product of a measurement matrix, M, and a signal represented by a column vector, f. Using equation 1 with the spectrum 400 from FIG. 4 as f and the measurement mask 700 shown in FIG. 7 as the measurement matrix M, the resulting masked measurement 800, g, is shown in FIG. 8. The appearance of the masked measurement 800 seems random, which corresponds to the pseudo random nature of the measurement mask 700 used to generate the masked measurement 800.

Figure 9:
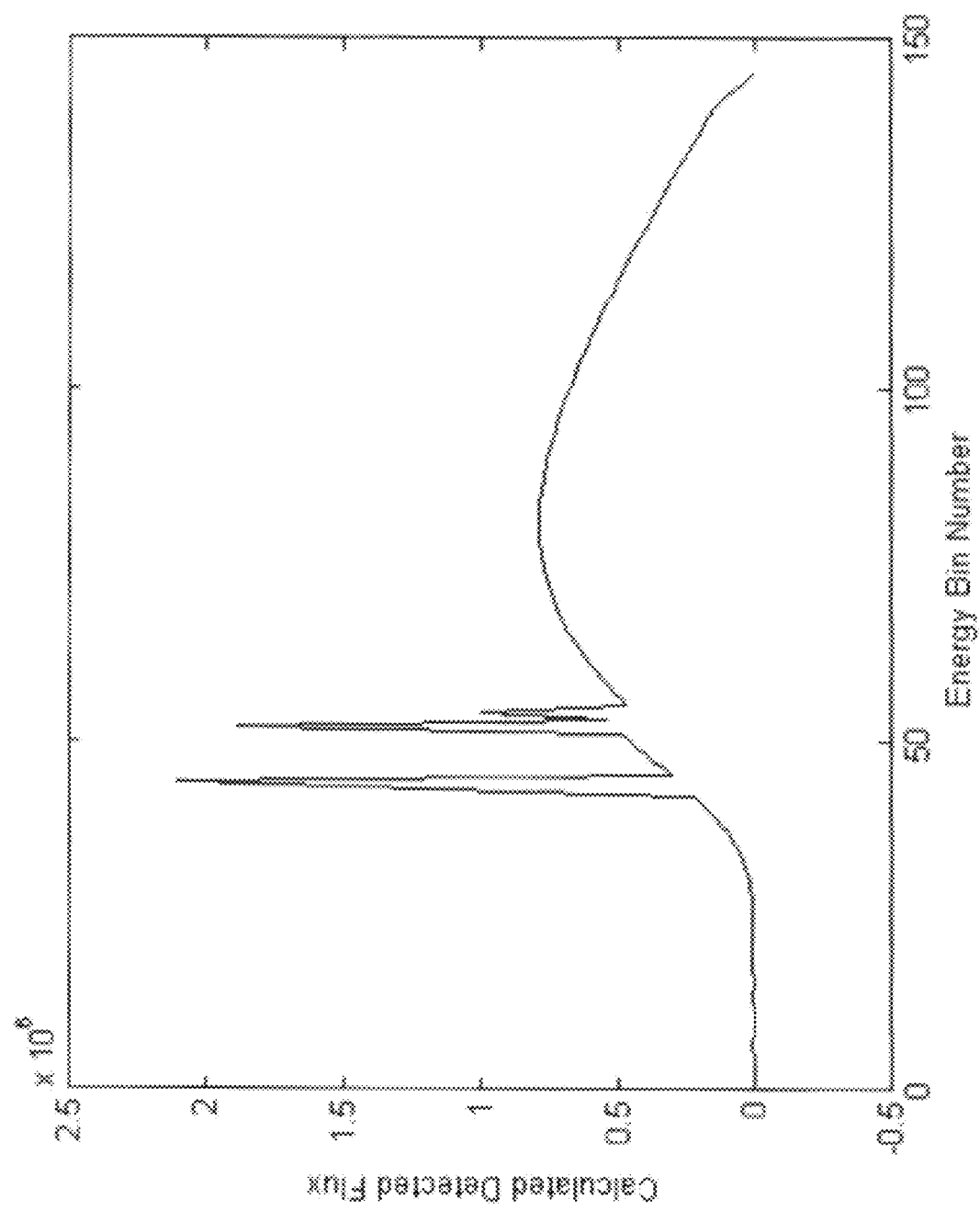
FIG. 9 depicts an example result of total variation minimization signal reconstruction according to one or more aspects of the disclosed subject matter.

FIG. 9 depicts an example result of total variation minimization signal reconstruction according to one or more aspects of the disclosed subject matter. Using the masked measured data 800 represented in FIG. 8 as the input to a total variation minimization reconstruction algorithm results in the reconstructed X-ray spectrum shown in FIG. 9. Further details of an example total variation minimization signal reconstruction approach compatible with the example embodiments described herein can be found in E. Sidky, et. al. "Accurate image reconstruction from few-views and limited-angle data in divergent-beam CT," Journal of X-ray Science and Technology 14 (2006) 119-139, the contents of which are hereby incorporated by reference.

Fifty iterations of an embodiment of a total variation minimization algorithm were performed. The example embodiment of the algorithm is capable of producing results that, with each iteration, converge closer to a target result within a desirable standard deviation. The result is nearly an exact replication of the original spectrum 400 from FIG. 4. The measurement mask 700 shown in FIG. 7 represents an example of one type of ideal measurement mask, which is capable of achieving a wide energy band-pass (e.g., 1 keV), with the center of the band-pass region(s) being easily selectable based on ideal mathematical features that are not limited by physically available materials. In practice, by varying possible combinations of available physical filters to produce example measurement masks, a finite number of possible physical materials available for use (e.g., foils of different types of metals) can be used, whose finite number of possible combinations results in a finite number of possible bandpass filter combinations which therefore influences the masked spectrum produced when a source spectrum is filtered according to the example measurement masks.

In an example, a practical physical measurement mask is based on, e.g., filter combinations of physical filters 116 that can be configured and arranged to form a measurement mask, such that a range of X-ray energies are allowed to pass by the various different combinations of individual filter materials each having its own absorption edge(s) and/or attenuation characteristics as illustrated, e.g., in FIG. 5. By combining multiple filter materials into different, e.g., pseudo-random combinations to create different wide energy bandpass regions in the measurement mask, the original spectrum can be reconstructed from masked measurement data obtained by a detector (e.g., integrating detector) implementing the measurement mask. An example of a wide band-pass measurement mask based on combinations of different available existing physical filters is shown in FIG. 10.

Figure 10:
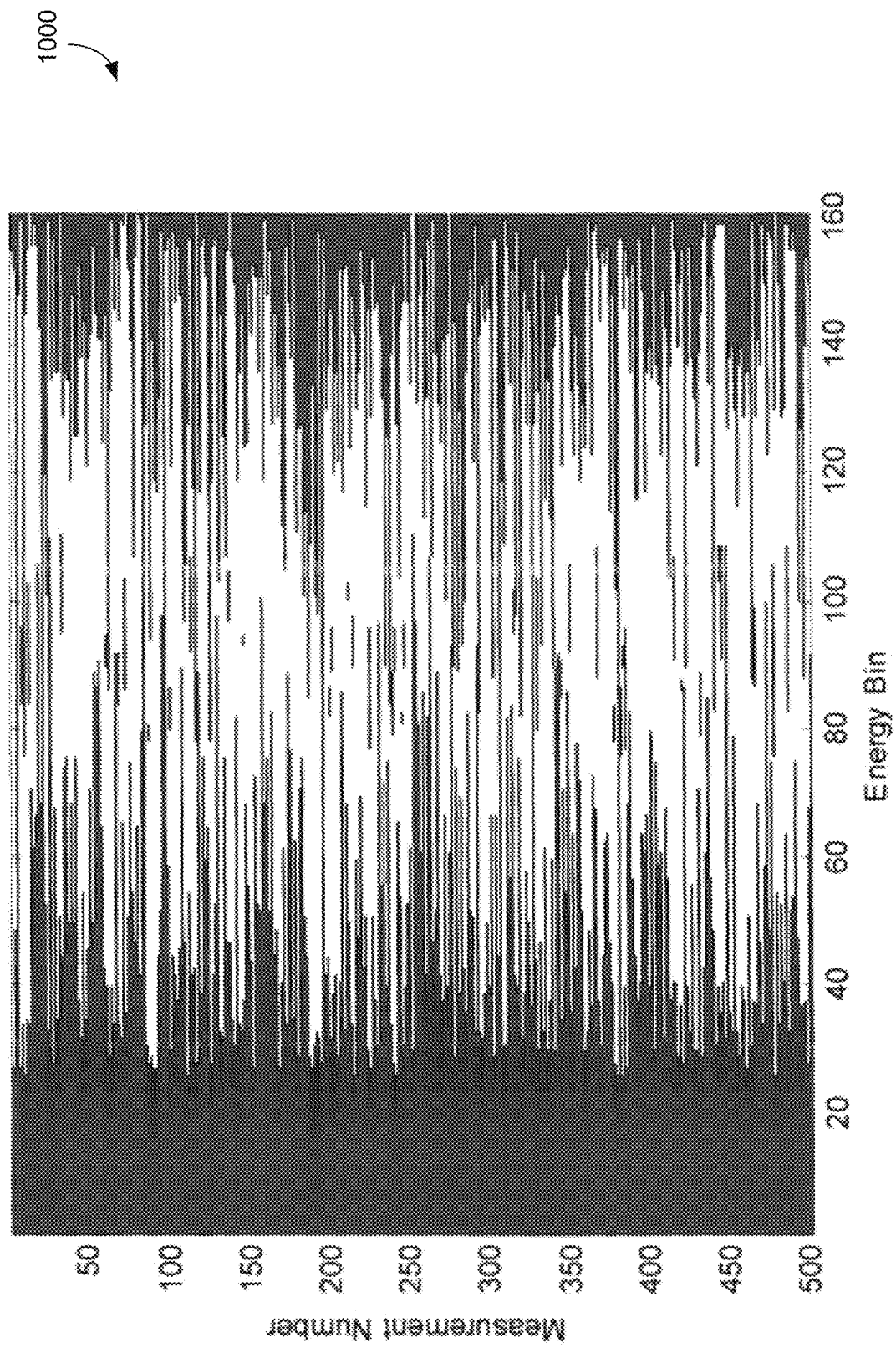
FIG. 10 depicts an example measurement mask including wide band-pass regions according to one or more aspects of the disclosed subject matter.

FIG. 10 depicts an example measurement mask 1000 including wide band-pass regions according to one or more aspects of the disclosed subject matter. Each measurement number corresponds to application of one or more physical filters, such that the one or more physical filters selectively blocks and passes the different energy bins. As illustrated, many of each of the measurement numbers of the measurement mask include a wide portion of white, illustrating a wide band pass for that combination of filter(s), with various sections of energy bins (e.g., approximately the lower energy bins 0-30, with various other higher energy bins) being blocked. Such passing and blocking behavior for each measurement number can be accomplished by using corresponding physical filter materials, based on the respective absorption edges and filtering behavior as explained above. The resulting masked spectrum 1100 represented by FIG. 11, filtered in accordance with the measurement mask 1000, depicts results that have been reconstructed from masked measured data as obtained by a practically achievable measurement mask such as measurement mask 1000.

Figure 11:
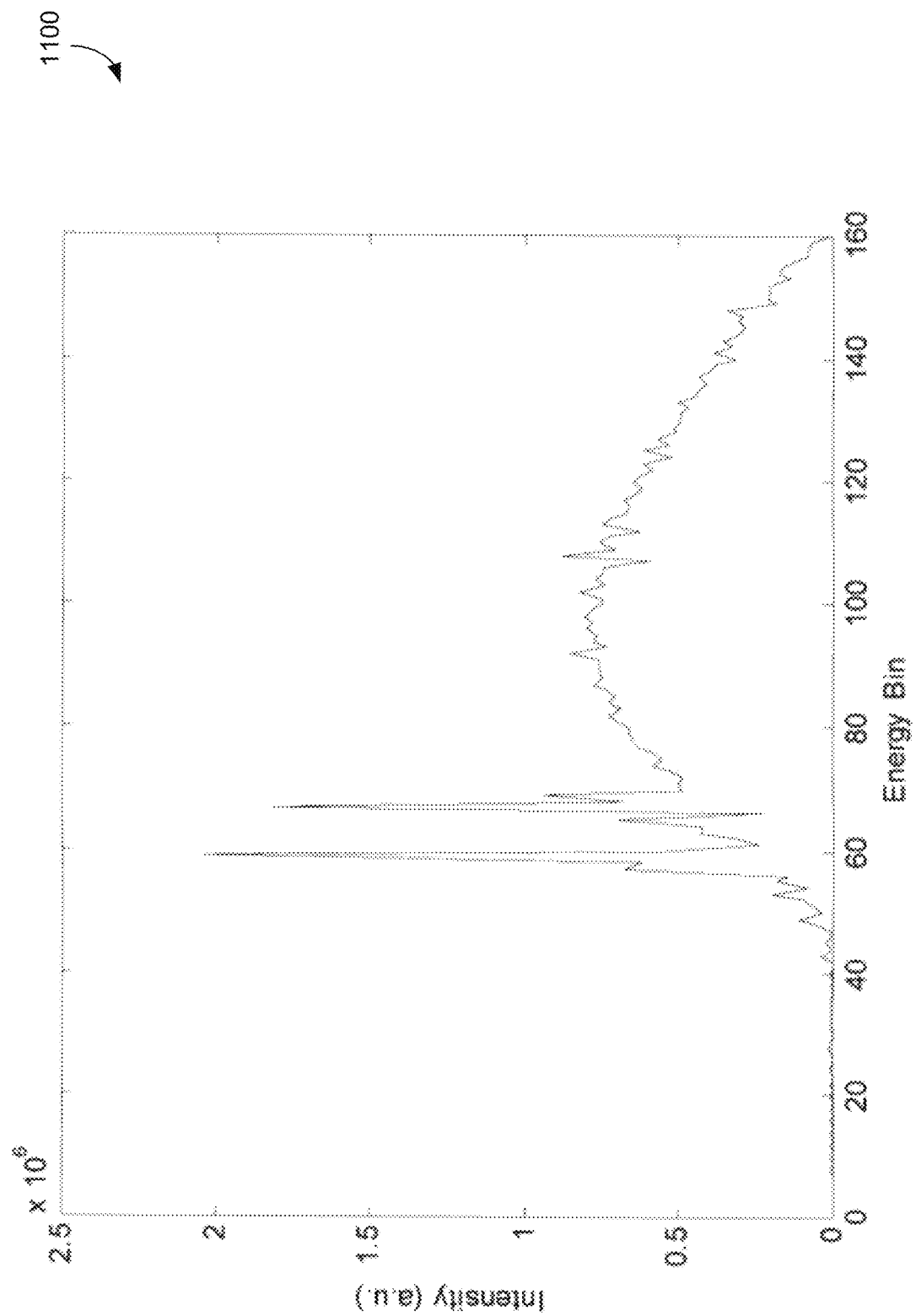
FIG. 11 depicts an example reconstructed spectrum using a wide band-pass measurement mask according to one or more aspects of the disclosed subject matter.

FIG. 11 depicts an example reconstructed spectrum 1100 using a wide band-pass measurement mask according to one or more aspects of the disclosed subject matter. As seen by the resulting spectrum 1100, a measurement mask containing wide band-pass regions (e.g., measurement mask 1000) can be used to filter an original X-ray spectra emitted toward the detector, enabling the detector to receive masked measured data filtered in accordance with the measurement mask that can be reconstructed to reveal spatial/energy resolution of the original X-ray spectra.

As a result of the system 100 using the measurement mask and reconstruction approach, the system 100 includes several advantages. For example, the system 100 includes improved spatial resolution and energy resolution. Additionally, contrary to other high energy resolution systems that need to be cooled significantly to reduce thermal noise, the system 100 reduces the need to be cooled significantly, thereby reducing complexity and expense of implementation.

Figure 12:
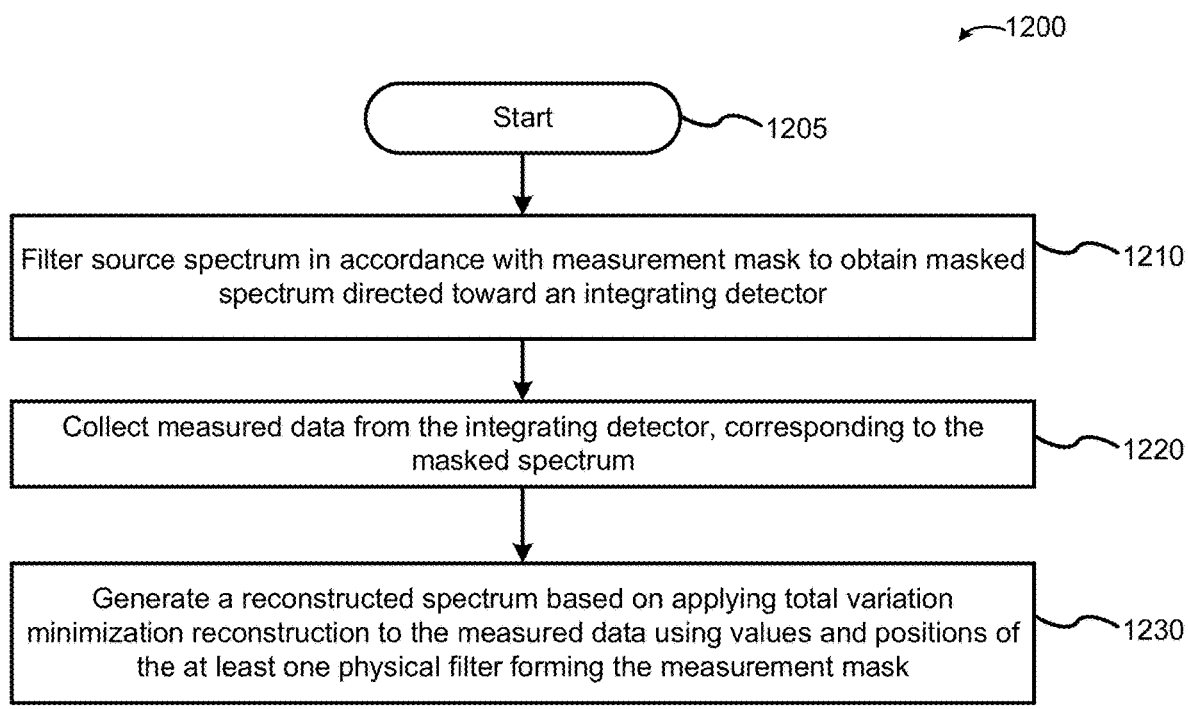
FIG. 12 is a flow chart of a method for reconstructing X-ray spectra using an integrating detector according to one or more aspects of the disclosed subject matter.

FIG. 12 is a flow chart of a method for reconstructing X-ray spectra using an integrating detector according to one or more aspects of the disclosed subject matter. In block 1210, an imaging system filters a source spectrum in accordance with a measurement mask including at least one physical filter to provide one or more wide energy band-pass regions. The measurement mask is positioned between an integrating detector and a source of the imaging system to filter the source spectrum into a masked spectrum that is directed toward the integrating detector. For example, the measurement mask can be supported by a frame between the detector and source, applied to a scintillator at a source of the imaging device, or can be mounted to a detector of the imaging device, or a combination of locations. The measurement mask can incorporate various different filter materials to cover the baseline X-ray energy of the source spectrum.

In block 1220, measured data is collected from the integrating detector, corresponding to the masked spectrum. The measured data is generated by the integrating detector, after the source spectrum has been filtered in accordance with the measurement mask and received as masked spectrum at the integrating detector.

In block 1230, a reconstructed spectrum of the source spectrum is generated, based on applying total variation minimization reconstruction to the measured data of the masked spectrum using values and positions of the at least one physical filter forming the measurement mask. For example, the imaging system can include processing circuitry and/or integrated computing system, or can provide data for processing by a separate computing system (e.g., remote device 120 and/or server 125), to iteratively solve a total variation minimization reconstruction algorithm, based on measurement values corresponding to a matrix of filter positions and attenuation values of the various filter materials of the measurement mask, to achieve convergence of the reconstructed spectrum.

The total variation minimization reconstruction algorithm can be iteratively optimized/solved by assuming an initial estimate for f, e.g., based on baseline expected spectrum of a given type of X-ray source. The algorithm can then be iterated by updating the initial estimate based on solving the algorithm, e.g., using equation 1 and information such as the collected measured data g, the measurement values of the measurement mask $M_{11} \ldots M_{kn}$, and the current estimated solution for f, which is then updated by having performed this iteration. The iterative solution proceeds until the current estimated solution converges. Convergence of the solution can be checked iteratively, e.g., whether there is an arbitrarily small difference between the solution of the current iteration and the solution of the previous iteration (e.g., based on an absolute value, or based on a relative value such as a percentage), whether the solutions converge to within a standard deviation, dynamically sampling different areas of the reconstructed spectrum to check for standard deviations in the sampled sections as a measure of how jittery or straight that section might appear as a measure for convergence, whether a given number of iterations have been performed (e.g., 50, or 500, etc.), whether a given amount of processing time has passed, or other approaches to check for convergence of the iterative process.

Figure 13:
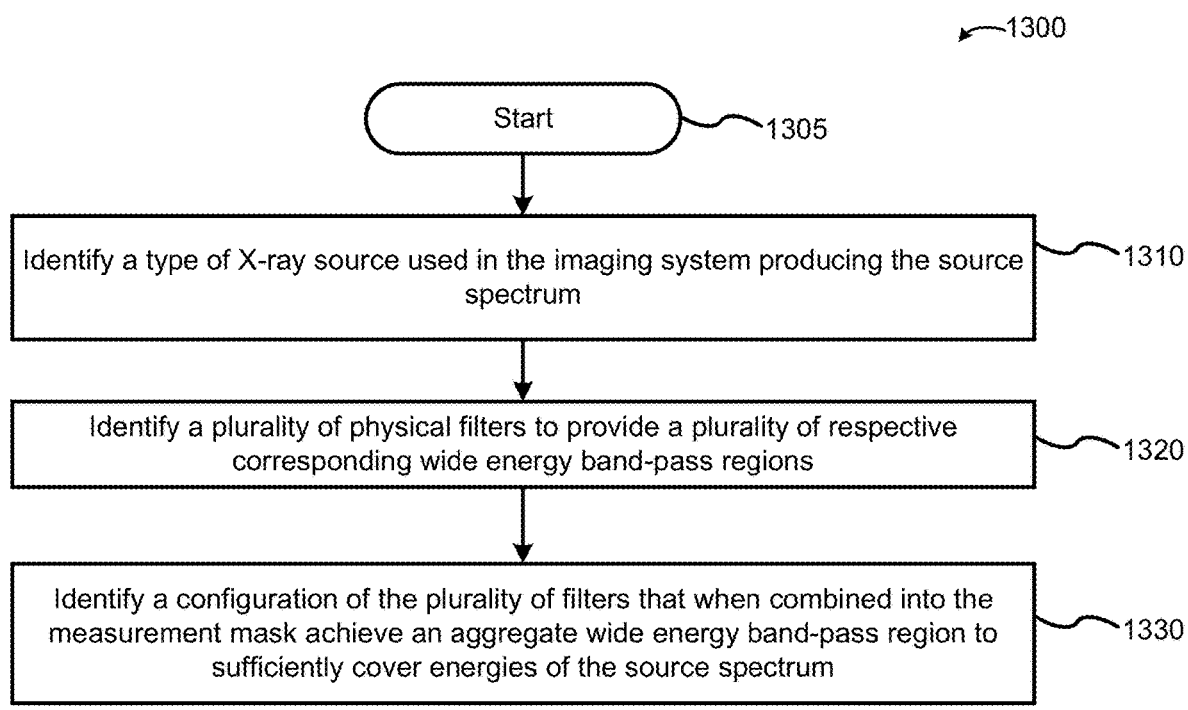
FIG. 13 is a flow chart of a method for identifying a configuration for a measurement mask according to one or more aspects of the disclosed subject matter.

FIG. 13 is a flow chart of a method for identifying a configuration for a measurement mask according to one or more aspects of the disclosed subject matter.

In block 1310, a type of X-ray source used in the imaging system producing the source spectrum is identified. For example, a processing system can identify what kind of X-ray tube (e.g., tungsten-based) is used in the imaging system, and what baseline characteristics are associated with that type of X-ray tube, including the baseline source spectrum. In an example embodiment, the imaging system identifies a brand and model number of the X-ray tube, and/or a technician inputs an identification of the X-ray tube into the imaging system.

In block 1320, a plurality of physical filters are identified, to provide a plurality of respective corresponding wide energy band-pass regions. For example, the baseline characteristics of the X-ray source can be used to identify which physical filter materials have absorption energies that can be used in aggregate to produce band-pass regions which sufficiently cover the baseline source spectrum of the X-ray source.

In block 1330, a configuration of the plurality of filters is identified that, when combined into the measurement mask, achieve an aggregate wide energy band-pass region(s) to sufficiently cover energies of the source spectrum. For example, the filters can be combined according to pseudo random combinations, to achieve wide energy band-pass regions as a result of the random combinations of the physical filters. The combination can be chosen to selectively omit some grids of the measurement mask, to allow pass-through of unfiltered source spectrum in the filtering of the source spectrum in accordance with the measurement mask. The combination also can be chosen such that there are gaps in the covered energies, such that the aggregate coverage is sufficient by virtue of iterative application of a reconstruction algorithm that can produce sufficient convergence of the reconstructed spectrum based on the purpose(s) which the reconstructed spectrum will serve (e.g., sufficient for a desired resolution level based on a type of item to be scanned). For example, the reconstructed signal 900 shown in FIG. 11 is sufficient for recognition of HMEs, and such a resolution can be achieved without fully covering the entire energy spectrum of the X-ray source. Accordingly, sufficient coverage can be viewed in terms of the given application of the reconstructed spectrum.

Figure 14:
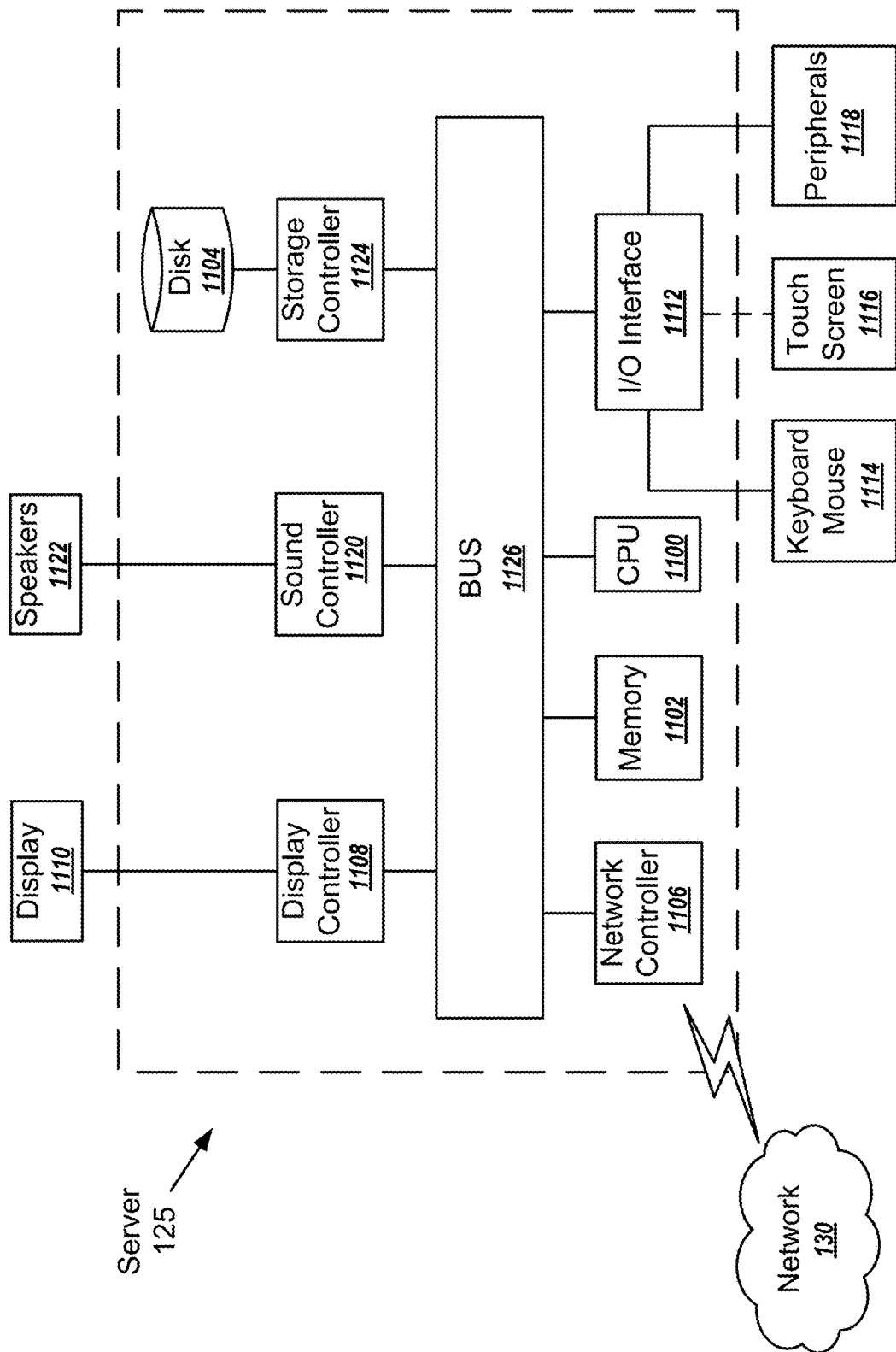
FIG. 14 is a hardware block diagram of a server according to one or more example aspects of the disclosed subject matter.

FIG. 14 is a hardware block diagram of the server 125 according to one or more example aspects of the disclosed subject matter. It should be appreciated that the hardware block diagram of FIG. 14 can also correspond to the imaging system 105 and/or the remote device 120. Next, a hardware description of the server 125 according to example embodiments is described with reference to FIG. 14. In FIG. 14, the server 125 includes a CPU 1100 which performs the processes described above/below. The process data and instructions may be stored in memory 1102. These processes and instructions may also be stored on a storage medium disk 1104 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the server 125 communicates, such as a server or computer.

Further, the claimed advancements may be provided as a utility application, background daemon, or component of an operating system, or combination thereof, executing in conjunction with CPU 1100 and an operating system such as Microsoft Windows, UNIX, Solaris, LINUX, Apple MAC-OS and other systems known to those skilled in the art.

The hardware elements in order to achieve the server 125 may be realized by various circuitry elements, known to those skilled in the art. For example, CPU 1100 may be a Xenon or Core processor from Intel of America or an Opteron processor from AMD of America, or may be other processor types that would be recognized by one of ordinary skill in the art. The CPU 1100 may be implemented on an FPGA, ASIC, PLD or using discrete logic circuits, as one of ordinary skill in the art would recognize. Further, CPU 1100 may be implemented as multiple processors cooperatively working in parallel to perform the instructions of the inventive processes described above.

The server 125 in FIG. 14 also includes a network controller 1106, such as an Intel Ethernet PRO network interface card from Intel Corporation of America, for interfacing with network 130. As can be appreciated, the network 130 can be a public network, such as the Internet, or a private network such as an LAN or WAN network, or any combination thereof and can also include PSTN or ISDN sub-networks. The network 130 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

The server 125 further includes a display controller 1108, such as a NVIDIA GeForce GTX or Quadro graphics adaptor from NVIDIA Corporation of America for interfacing with display 1110, such as a Hewlett Packard HPL2445w LCD monitor. A general purpose I/O interface 1112 interfaces with a keyboard and/or mouse 1114 as well as a touch screen panel 1116 on or separate from display 1110. General purpose I/O interface also connects to a variety of peripherals 1118 including printers and scanners, such as an OfficeJet or DeskJet from Hewlett Packard.

A sound controller 1120 is also provided in the server 125, such as Sound Blaster X-Fi Titanium from Creative, to interface with speakers/microphone 1122 thereby providing sounds and/or music.

The general purpose storage controller 1124 connects the storage medium disk 1104 with communication bus 1126, which may be an ISA, EISA, VESA, PCI, or similar, for interconnecting all of the components of the server 125. A description of the general features and functionality of the display 1110, keyboard and/or mouse 1114, as well as the display controller 1108, storage controller 1124, network controller 1106, sound controller 1120, and general purpose I/O interface 1112 is omitted herein for brevity as these features are known.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

The functions and features described herein may also be executed by various distributed components of a system. For example, one or more processors may execute these system functions, wherein the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

The invention claimed is:

1. An imaging system for reconstructing X-ray spectra, comprising:
   an X-ray source that emits X-ray energy according to a source spectrum;
   an integrating detector;
   a measurement mask including at least one physical filter positioned between the X-ray source and the integrating detector to filter the source spectrum to produce a masked spectrum; and
   processing circuitry configured to:
      collect measured data from the integrating detector, corresponding to the masked spectrum; and
      generate a reconstructed spectrum, serving as a representation of the source spectrum that has been mathematically reconstructed, based on applying a predetermined algorithm to the measured data using an identified configuration of the measurement mask.

2. The system of claim 1, wherein the measurement mask includes a plurality of physical filters of a corresponding plurality of energy band-pass regions to filter at least a portion of the source spectrum.

3. The system of claim 2, wherein the plurality of physical filters are arranged in a pseudo-random pattern to achieve an aggregate wide energy band-pass region of the measurement mask to cover energies of the source spectrum.

4. The system of claim 2, wherein the plurality of physical filters are arranged corresponding to ordered mathematical combinations to achieve an aggregate wide energy band-pass region of the measurement mask to cover energies of the source spectrum.

5. The system of claim 1, wherein the measurement mask includes a plurality of physical filters configured and arranged to filter the source spectrum according to a sub-pixel basis, wherein a given sub-pixel of the measurement mask is smaller in area than a given pixel of the integrating detector.

6. The system of claim 5, wherein the plurality of physical filters of the measurement mask are arranged to provide four sub-pixels of filtering for each pixel of the integrating detector.

7. The system of claim 1, wherein the measurement mask provides the at least one physical filter comprising a plurality of metal foils, associated with corresponding pluralities of enhanced X-ray energy absorption edges and attenuation values, arranged in a two-dimensional grid corresponding to pixels of the integrating detector.

8. The system of claim 7, wherein the two-dimensional grid includes at least one overlapping plurality of metal foils corresponding to providing an attenuation value of the overlapping plurality of metal foils for at least a given sub-pixel of the integrating detector.

9. The system of claim 8, wherein the at least one overlapping plurality of metal foils corresponds to at least a given pixel of the integrating detector.

10. The system of claim 1, wherein the predetermined algorithm is configured to perform a total variation minimization reconstruction.

11. The system of claim 10, wherein the reconstructed spectrum is generated based on an iterative application of the total variation minimization reconstruction to iteratively check whether convergence of the reconstructed spectrum has been reached.

12. The system of claim 1, wherein the measurement mask is positioned in the imaging system between the X-ray source and the integrating detector to enable the integrating detector to directly receive the masked spectrum during operation of the imaging system.

13. The system of claim 12, wherein the measurement mask is coupled to the integrating detector.

14. The system of claim 1, wherein the measurement mask is positioned in the imaging system between the X-ray source and the integrating detector to enable the measurement mask to directly receive the source spectrum during operation of the imaging system.

15. The system of claim 14, wherein the imaging system further comprises a scintillator, and the measurement mask is coupled to the scintillator.

16. A method for reconstructing X-ray spectra using an integrating detector, comprising:
   filtering, by an imaging system, X-ray energy emitted by an X-ray source according to a source spectrum, the filtering in accordance with a measurement mask including at least one physical filter positioned between the X-ray source and an integrating detector of the imaging system to filter the source spectrum to produce a masked spectrum;
   collecting measured data from the integrating detector, corresponding to the masked spectrum; and
   generating a reconstructed spectrum, serving as a representation of the source spectrum that has been mathematically reconstructed, based on applying a predetermined algorithm to the measured data using an identification of the measurement mask.

17. The method of claim 16, further comprising:
   identifying a type of X-ray source used in the imaging system to produce the source spectrum;
   identifying a plurality of physical filters to provide a plurality of respective corresponding wide energy band-pass regions; and
   identifying a configuration of the plurality of filters that when combined into the measurement mask achieve an aggregate wide energy band-pass region to cover energies of the source spectrum.

18. The method of claim 17, wherein the plurality of physical filters are identified based on providing a plurality of respective corresponding enhanced absorption edges at X-ray energies spanning a range of X-ray energies produced by the X-ray source.

19. The method of claim 17, further comprising identifying the type of X-ray source as an anode material suitable for non-destructive evaluation, including at least one of tungsten, molybdenum, and copper.

20. A non-transitory computer-readable storage medium storing computer-readable instructions that, when executed by a computer, cause the computer to perform the method of:
   collecting measured data from an integrating detector of an imaging system, corresponding to a masked spectrum obtained by filtering X-ray energy emitted by an X-ray source according to a source spectrum, the filtering in accordance with a measurement mask including at least one physical filter positioned between the X-ray source and the integrating detector; and
   generating a reconstructed spectrum, serving as a representation of the source spectrum that has been mathematically reconstructed, based on applying a predetermined algorithm to the measured data using an identification of the measurement mask.

* * * * *